(12) United States Patent
Kitano (10) Patent No.: US 6,278,475 B1
(45) Date of Patent: Aug. 21, 2001

(54) OPTICAL WRITING DEVICE

(75) Inventor: Hirohisa Kitano, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/992,903

(22) Filed: Dec. 18, 1997

(30) Foreign Application Priority Data

Dec. 19, 1996 (JP) .................................................. 8-340122

(51) Int. Cl.$^7$ ................................................ B41J 15/14
(52) U.S. Cl. ........................ 347/242; 347/257; 347/238
(58) Field of Search .................. 347/238, 241, 347/256, 257, 242, 236, 244; 250/234; 355/32, 400; 372/70

(56) References Cited

U.S. PATENT DOCUMENTS

| 4,524,372 | | 6/1985 | De Cock et al. ................... 347/238 |
| 4,532,526 | * | 7/1985 | Behrens et al. ..................... 347/242 |
| 4,760,427 | * | 7/1988 | Oyama et al. ........................ 355/32 |
| 4,870,506 | | 9/1989 | Nakauchi ............................. 358/296 |
| 4,907,034 | | 3/1990 | Doi et al. ............................. 355/400 |
| 4,918,465 | | 4/1990 | Morita ................................. 347/232 |
| 5,502,490 | * | 3/1996 | Takanashi et al. .................. 358/296 |
| 5,617,441 | * | 4/1997 | Nakata et al. ........................ 372/70 |
| 5,691,535 | * | 11/1997 | Boutet ................................. 250/234 |
| 5,753,907 | * | 5/1998 | Nakajima et al. ................... 250/234 |
| 5,880,766 | * | 3/1999 | Murakami et al. .................. 347/236 |
| 5,886,728 | * | 3/1999 | Hamada et al. ..................... 347/242 |

FOREIGN PATENT DOCUMENTS 09123526    5/1997    (JP) .

* cited by examiner

*Primary Examiner*—N. Le
*Assistant Examiner*—Hai C. Pham
(74) *Attorney, Agent, or Firm*—McDermott, Will & Emery (57) ABSTRACT

Disclosed are optical writing devices each of which has three arrays of light shutter elements for emitting light signals of red, green and blue, respectively. The arrays of light shutter elements of each optical writing device are adjustably provided in an image forming apparatus with respect to sub-scan direction.

29 Claims, 8 Drawing Sheets

OPTICAL WRITING DEVICE

BACKGROUND OF THE INVENTION

1. Field of the Invention

The present invention relates to a solid-state scanning-type optical writing device for writing an image (latent image) on the surface of an image carrying member such as a photosensitive member, photosensitive paper or the like using a plumbus lanthanum zirconate titanate (PLZT) light shutter array, light-emitting diode (LED) array or the like.

2. Description of the Related Art

Heretofore, there have been various proposed optical writing devices which control the ON/OFF switching of each single pixel via a plurality of light signal emitting elements to form an image (latent image) on the surface of an image carrying member such as an electrophotographic photosensitive member, silver salt film, printing paper using silver salt material and the like. Light shutter elements such as PLZTs and the like, and light-emitting elements such as LEDs and the like have been proposed as light signal emitting elements. The light signal emitting elements are arranged in a main-scan direction, and form a light signal emitting array.

To form a full color image by using aforementioned type of light signal emitting elements, consideration may be given to providing three light signal emitting arrays so that the light signal emitting arrays correspond to red (R), green (G), and blue (B), respectively. Furthermore, consideration also may be given to arraying the light signal emitting arrays in the sub-scan direction. A disadvantage arises, however, as to the degree of precision with which light from said mutually independent light signal emitting elements irradiates the surface of the image carrying member.

SUMMARY OF THE INVENTION

An object of the present invention is to provide an optical writing device capable of reproducing high quality images.

Another object of the present invention is to provide an optical writing device capable of reproducing images with excellent precision.

An object of the present invention is to provide a solid-state scanning-type optical writing device capable of reproducing high quality images with excellent precision when forming color images using light signal emitting arrays arranged in the sub-scan direction such that light emission color of each said array is different.

To achieve at least one of aforesaid objects, a light signal emitting device of the present invention comprises:

a plurality of light signal emitting arrays each of which includes a plurality of light emitting elements arranged in a main-scan direction, the light signal emitting arrays being disposed in a sub-scan direction orthogonal to the main-scan direction; and an adjuster which adjusts a position of at least one of the light signal emitting arrays, said adjuster adjusting the position with respect to the sub-scan direction. When the light signal emitting arrays are arranged on a base, the base can be accommodated in a single housing such that all light signal emitting arrays can be positionally adjusted in the sub-scan direction. Furthermore, when each light signal emitting array is arranged on a different base, and each bese is mounted in a respectively independent housing, at least one said housing may be positionally adjustable in the sub-scan direction.

According to another aspect of the present invention, an optical writing device comprises:

a first optical system for emitting light signals of first color, the first optical system comprising a first array of light signal emitting elements and first lens, the light signal emitting elements of the first array being arranged in a main-scan direction orthogonal to the sub-scan direction, the first lens being disposed at an image side of the first array and requiring a first length to focus the light signals of first color; and a second optical system, provided at one side of the first optical system with respect to the sub-scan direction, for emitting light signals of second color, the second optical system comprising a second array of light signal emitting elements and lens, the light signal emitting elements of the second array being arranged in the main-scan direction, the second lens being disposed at an image side of the second array and requiring a second length to focus the light signals of second color which has a wavelength greater than that of said first color, wherein the first optical system and the second optical system are set in accordance with the first length and the second length, respectively. In the optical writing device of the present invention, the distance between each light signal emitting array and the surface of the image carrying member may differ in accordance with the wavelength of the light emission color, or a focus position-correcting optical element may be provided between the light signal emitting array and the surface of the image carrying member. Since the image forming distance of each color light differs in accordance with the wavelength, having the distance between each light signal emitting array and the surface of the image carrying member differ according to the wavelength of the light emission color allows for accurate focus positioning on the surface of the image carrying member for each color, as well as highly accurate and high quality color image reproducibility. Interposing a focus position correcting optical element between an optical chip array and the surface of the image carrying member to adjust the focus position in accordance with said wavelength or relative to the curvature of the surface of the image carrying member in the sub-scan direction allows highly accurate and high quality color image reproducibility.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the solid-state scanning-type optical writing head of the present invention are described hereinafter with reference to the accompanying drawings.

General construction of color Printer

Figure 1:
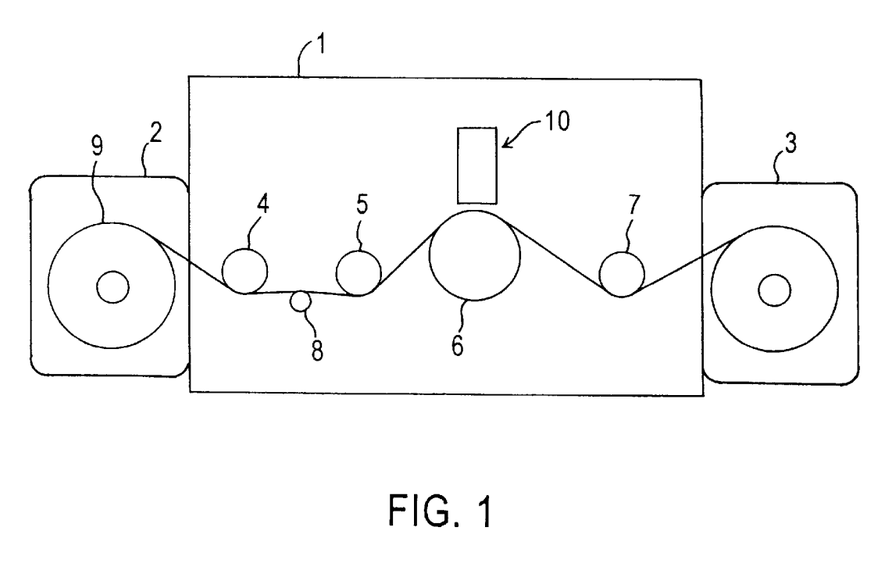
FIG. 1 briefly shows the construction of a color printer provided with an optical writing head of the present invention.

FIG. 1 shows a color printer for photographic printing provided with an optical writing head of the present invention. This color printer accommodates optical writing head 10 and printing paper transport unit in its body unit 1. The printing paper transport unit includes transport rollers 4 and 5, platen roller 6, transport roller 7, and tension roller 8. A print paper supply magazine 2 accommodating roll-type printing paper using a silver sale sensitive material is installed at the left side of body 1. A printing paper winding magazine 3 is installed at the right side of body 1. Printing paper 9 is guided into body 1 from magazine 2, and transported to magazine 3 via transport rollers 4 and 5, platen roller 6, and transport roller 7. Printing paper 9 is transported under a predetermined state of tension via tension roller 5. Optical writing head 10 writes an image (latent image) on printing paper 9 above platen roller 6. Magazine 3 accommodating exposed printing paper 9 is moved from body 1 and is installed to a processor (not illustrated). Exposed printing paper 9 is then developed, dried, and cut by the processor.

Brief Description of Optical Writing Head Construction

Figure 2:
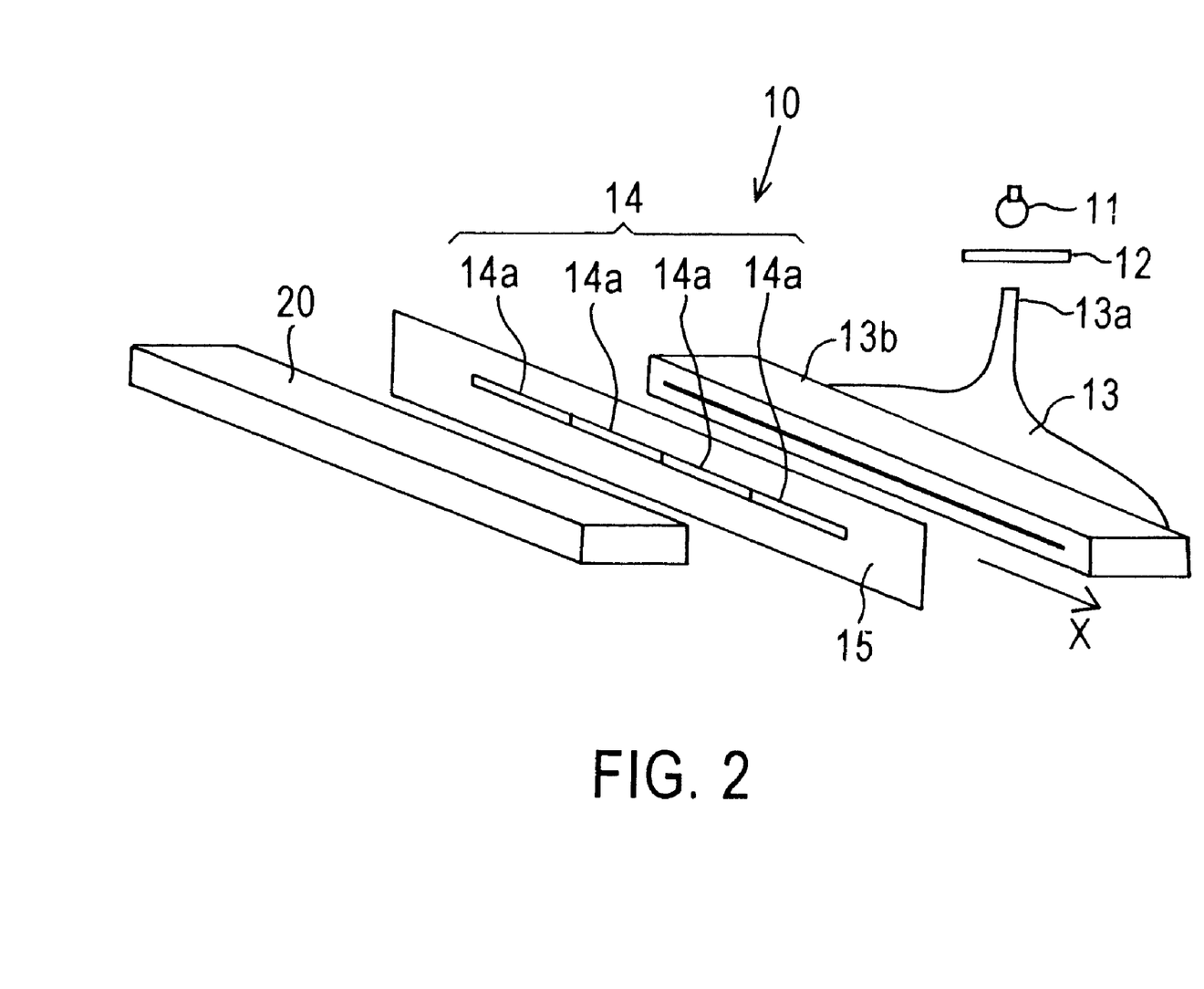
FIG. 2 is a perspective view of the aforesaid optical writing head.

FIG. 2 shows a full color optical writing head 10 installed in the aforesaid color printer. Optical writing head 10 briefly comprises halogen lamp 11, heat-sink filter 12, light guide 13, light shutter array 14, and lens array 20. Light guide 13 comprises a plurality of optical fiber light guides. The optical fiber light guides of light guide 13 are bundled at one end 13a thereof which confronts heat-sink filter 12. The other end 13b of light guide 13 is lined in the main-scan direction indicated by the arrow X such that light is emitted in linear fashion.

Light shutter array 14 is provided on a slit-like opening in a ceramic substrate or on top of a glass substrate (hereinafter referred to as "base substrate 15"). Light shutter array 14 comprises a plurality of PLZT light shutter chips 14a arranged in the main-scan direction X. In the example of the drawing, there are four light shutter chips 14a. Each light shutter chip 14 includes a plurality of light shutter elements formed by a dicing process. Each shutter element corresponds to a pixel position, and only transmits light of a predetermined pixel in accordance with image data. Light shutter array 14 is formed of a well known ceramic material capable of transmitting light and having a Kerr constant with a large opto-electric efficiency, and provided with a crossed Nichols polarizer and analyzer before and after the optical path. Light linearly polarized by the aforesaid polarizer induces rotation of the plane of polarization via the ON/OFF switching of an electric field generating a voltage applied to each optical shutter element, and light emitted from the analyzer is switched ON/OFF so as to form an image on printing paper 9 via lens array 20.

Figure 3:
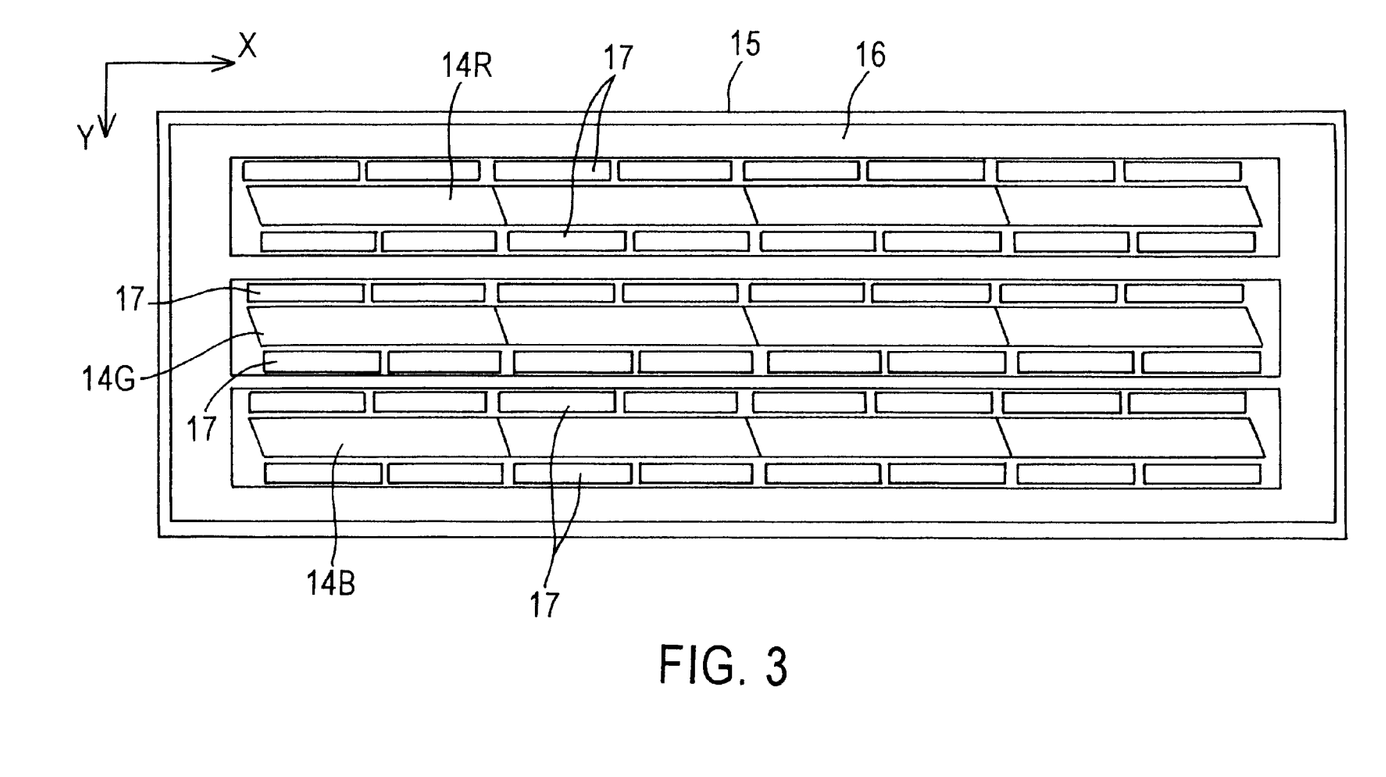
FIG. 3 is a plan view of the of the light shutter module of said optical writing head.

Optical writing head 10 is provided with an RGB filter (not shown in the drawing) at the light source to form full color images by dividing the light emitted from halogen lamp 11 into the three primary colors red, green, blue which enter light shutter array 14. Light shutter array 14, as shown in FIG. 3, has three array rows comprising red array 14R, green array 14G, and blue array 14B arranged on base substrate 15 in the sub-scan direction. Light shutter arrays 14R, 14G, 14B are sequentially lighted one array at a time synchronously with the transport of printing paper 9 in the sub-scan direction. The light guide 13 and lenses 20 are arranged in three rows coinciding with the three-row arrangement of the light shutter array, as described below.

Circuit board 16 and a driver integrated circuit (IC) 17 are provided on base substrate 15 to drive the light shutter array 14, as shown in FIG. 3.

To achieve precious full color image formation, optical writing head 10 comprises an adjuster for adjusting the positions of arrays 14R, 14G in the sub-scan direction Y or in a direction of light emission, or a corrector for correcting the focus position on printing paper 9. The constructions of the first through seventh embodiments are described below.

Figure 4:
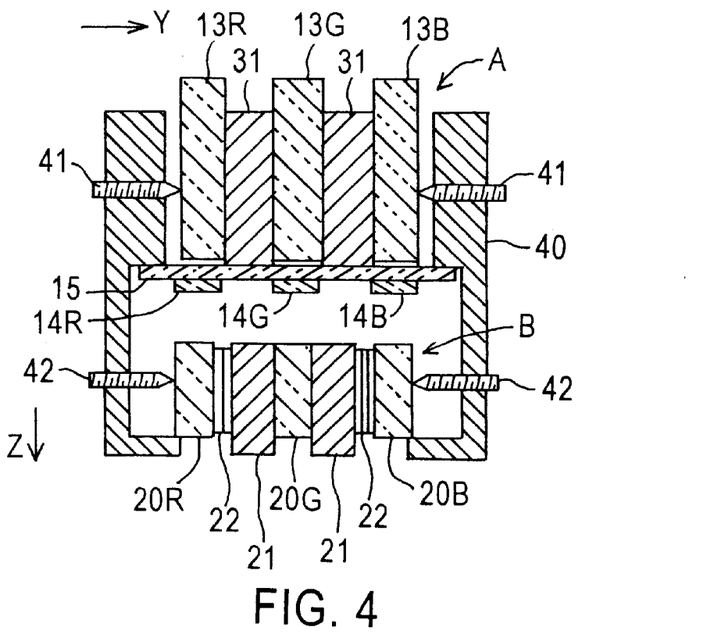
FIG. 4 is a section view illustrating the essential parts of a first embodiment.

FIRST EMBODIMENT (FIG. 4)

In the first embodiment, light shutter module has housing 40 which accommodates blocks A and B. Block A is comprised of light shutter arrays 14R, 14G, and 14B which are arranged in three rows on a single base substrate 15, light guides 13R, 13G and 13B, and spacers 31. Block A is positionally adjustable in the sub-scan direction Y relative to housing 40 by two adjustment screws 41. Lenses 20R, 20G, 20B are integratedly constructed via spacers 21 and 22 as block B. Block B is also positionally adjustable in the sub-scan direction Y relative to housing 40 by two adjustment screws 42. Blocks A and B are positionally fixed relative to housing 40 in the light emission direction Z.

In the first embodiment, Blocks A and B are independently positionally adjustable in the sub-scan direction Y. Therefore, image accuracy is improved by fine adjustment in the sub-scan direction Y of light shutter arrays 14R, 14G, 14B, and lenses 20R, 20G, 20B.

Figure 5:
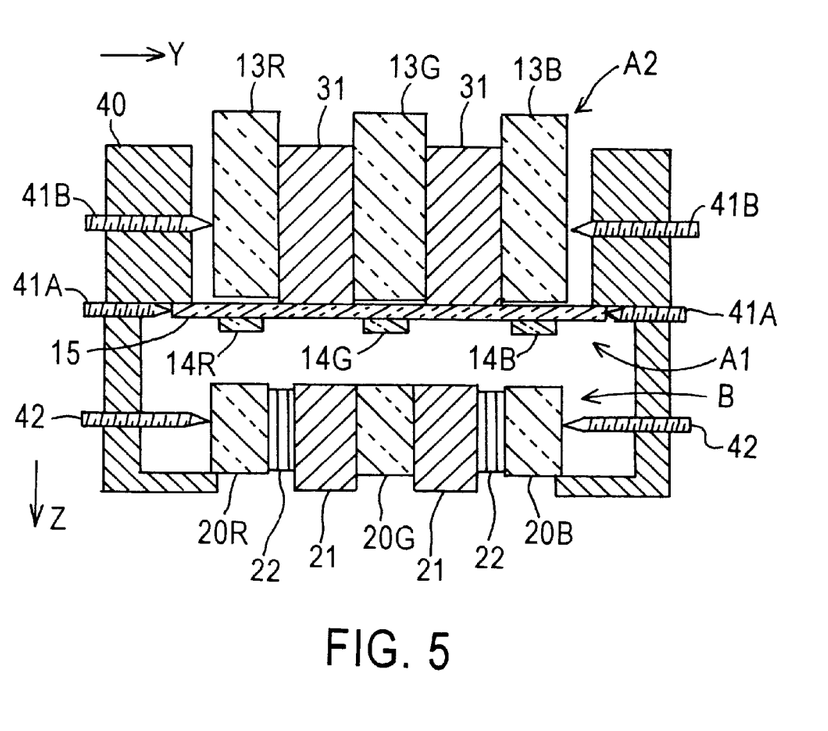
FIG. 5 is a section view showing the essential parts of a second embodiment.

SECOND EMBODIMENT (FIG. 5)

The second embodiment divides block A of the first embodiment into blocks Al and A2. That is, light shutter arrays 14R, 14G, 14B on base substrate 15 are arranged in three rows comprising block Al, and light guides 13R, 13G, 13B and spacers 31 comprise block A2. Block Al and A2 are independently positionally adjustable relative to housing 40 in the sub-scan direction Y via their respective adjustment screws 41A and 41B. Lenses 20R, 20G, 20B of block B are identical in construction to that described in the first embodiment.

According to the second embodiment, block A is divided into blocks Al and A2, and are independently positionally adjustable in the sub-scan direction Y, thereby improving image accuracy.

Figure 6:
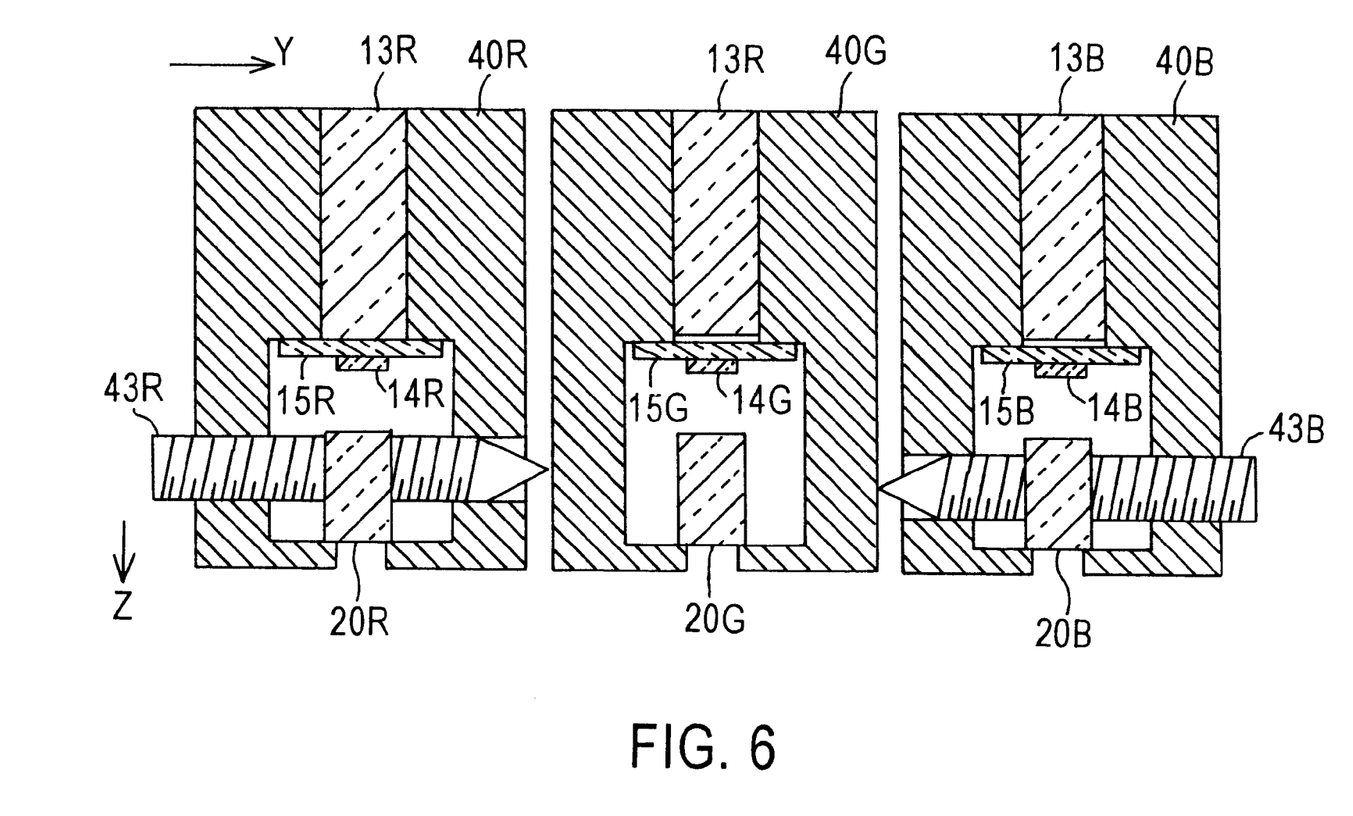
FIG. 6 is a section view showing the essential parts of a third embodiment.

THIRD EMBODIMENT (FIG. 6)

In the third embodiment, light shutter arrays 14R, 14G and 14B are arranged on three base substrates 15R, 15G and 15B, respectively. These base substrates 15R, 15G and 15B are respectively accommodated in three housings 40R, 40G and 40B. Lenses 20R, 20G and 20B are also respectively accommodated in housings 40R, 40G and 40B. Housings 40R, 40G and 40B are arranged in a row in the sub-scan direction. Housings 40R and 40B are provided with adjustment screws 43R and 43B through said housings 40R and 40B in the Y direction. Housings 40R and 40B are positionally adjustable relative to the center housing 40G in the sub-scan direction via said adjustment screws 43R and 43B.

In third embodiment, right and left red emission unit and blue emission unit are independently positionally adjustable in the sub-scan direction Y relative to the center green emission unit. Image accuracy is therefore improved.

Figure 7:
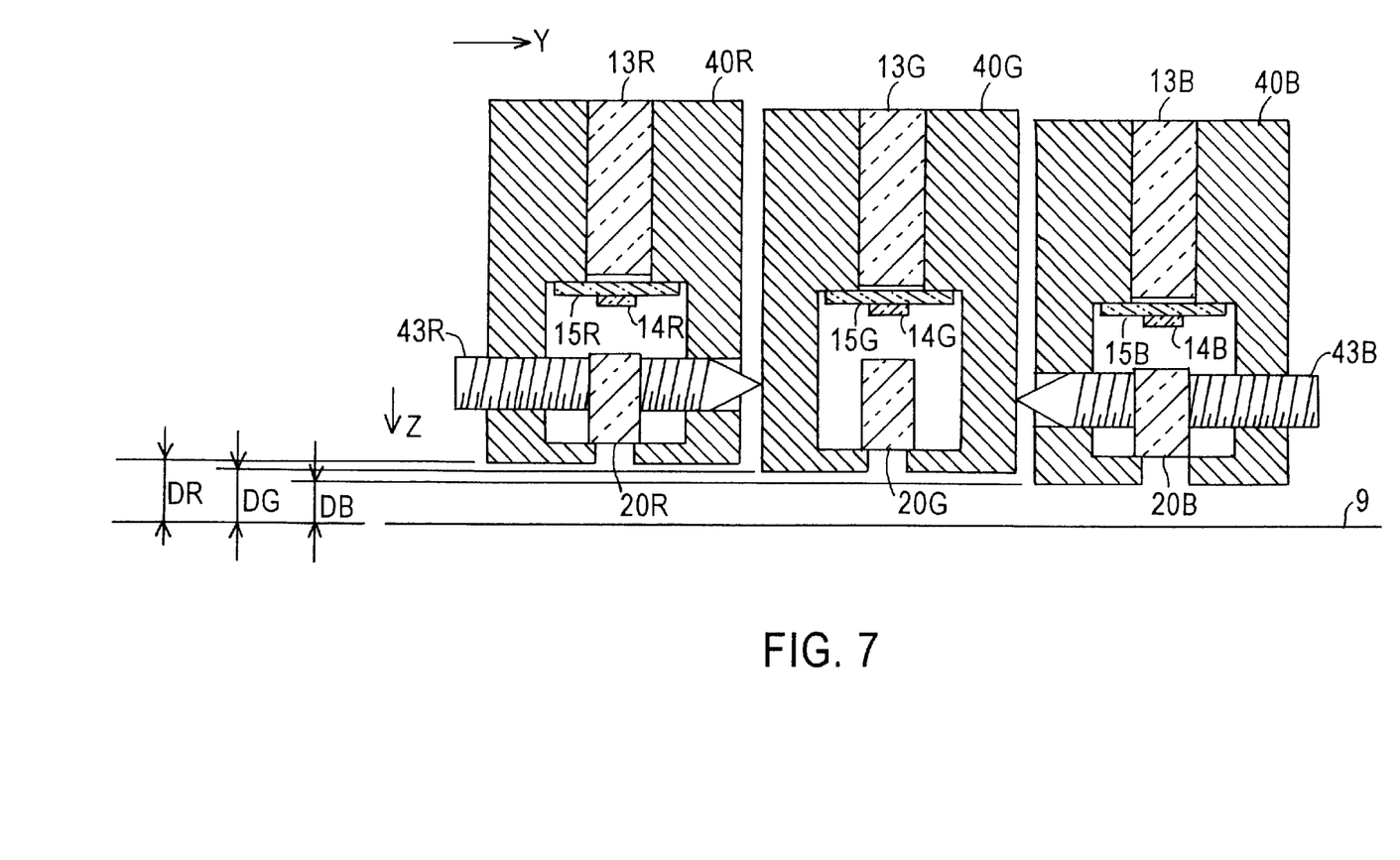
FIG. 7 is a section view showing the essential parts of a fourth embodiment.

FOURTH EMBODIMENT (FIG. 7)

The fourth embodiment is provided with a basic construction identical to that of the third embodiment, with each housing 40R, 40G and 40B having different positions in the light emission direction Z. That is, housing 40R is set at a distance DR, housing 40G is set at a distance DG, and housing 40B is set at a distance DB relative to the printing paper 9 (photoreceptive surface).

Normally, the imaging distance (the distance between the principal point of lens and the imaging point) increases in proportion to the wavelength, such that when each color is emitted with the optical units set at the same distance relative to the photoreceptive surface, there is dislocation of the focus point of each color. Accordingly, in the fourth embodiment, the distances DR, DG and DB are set in accordance with the imaging distances of the three colors, respectively. Arranging as above, the imaging point of each color matches the photoreceptive surface, and image accuracy is improved.

Figure 8:
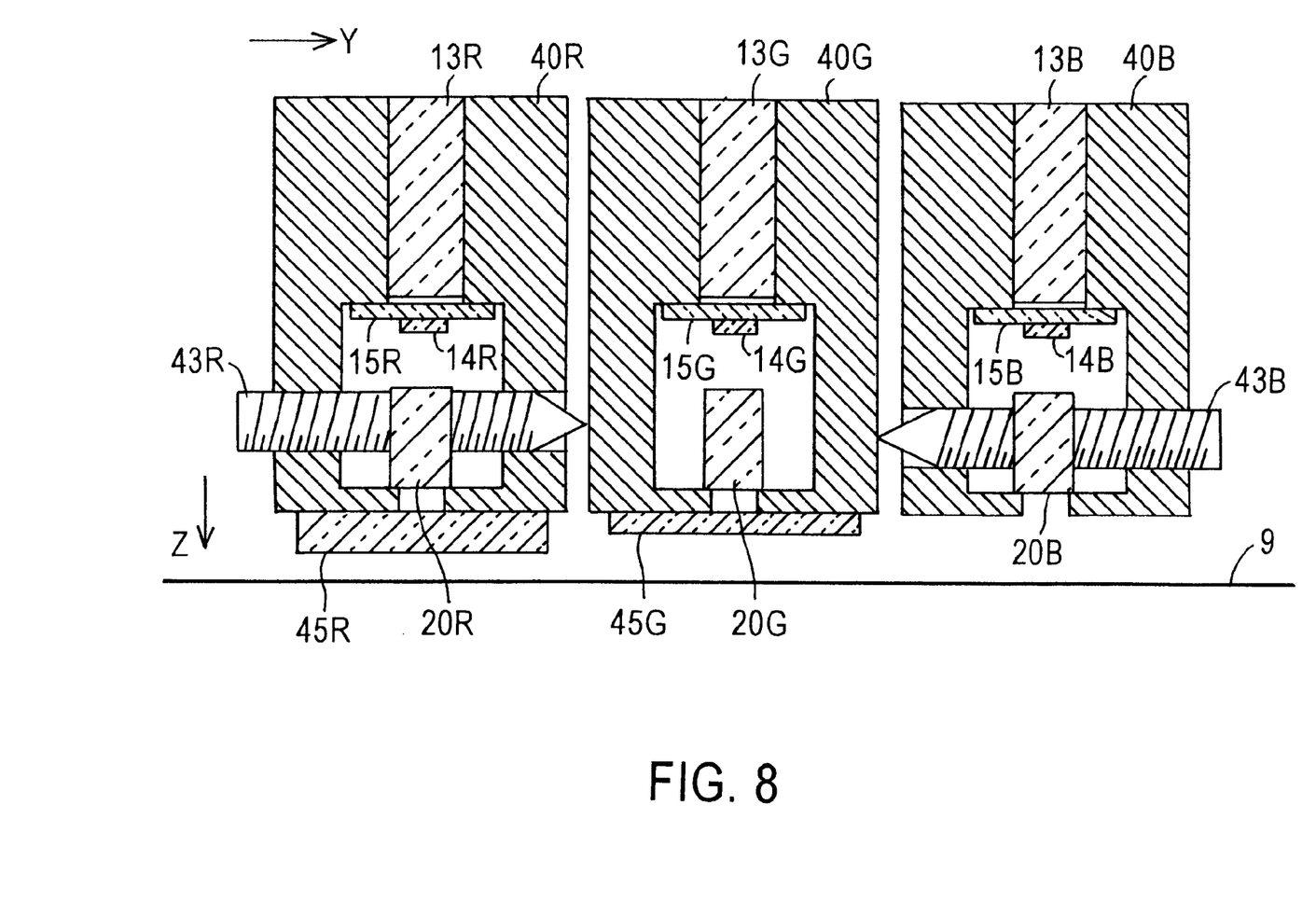
FIG. 8 is a section view showing the essential parts of a fifth embodiment.

FIFTH EMBODIMENT (FIG. 8)

The fifth embodiment provides glass plates 45R, 45G and 45B at the light emission portions of housings 40R and 40G to achieve an effectiveness similar to that of the fourth embodiment. Each of glass plates 45R and 45G allows modification of the imaging distance via the respective refractive index. In the fifth embodiment, the positions of housings 40R, 40G, 40B relative to the printing paper 9 (photoreceptive surface) are set to match the imaging distance of the blue color, which is the shortest among the three color. On the other hand, the imaging points of the long imaging distance colors of red and green can be corrected by suitably selecting refractive indexes for glass plates 45R and 45G.

Figure 9:
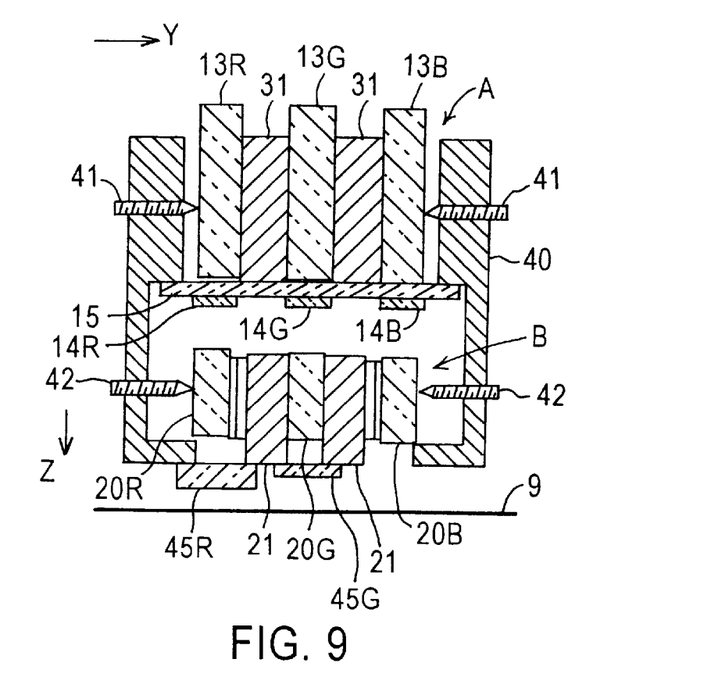
FIG. 9 is a section view showing the essential parts of a sixth embodiment.

SIXTH EMBODIMENT (FIG. 9)

The sixth embodiment improves image accuracy by providing the glass plates 45R and 45G of the fifth embodiment to the first embodiment of FIG. 4.

Figure 10:
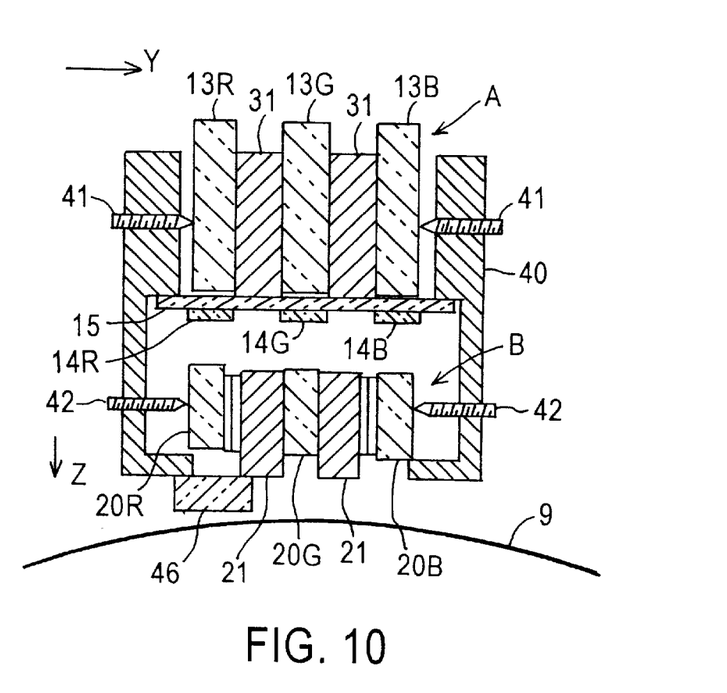
FIG. 10 is a section view showing the essential parts of a seventh embodiment.

SEVENTH EMBODIMENT (FIG. 10)

The seventh embodiment provides a lens 46 to the first embodiment of FIG. 4. The purpose of lens 46 is to cause the red color light receiving position to be farther away than the light receiving positions of other colors due to the curvature of the printing paper 9 at the exposure region. The focus position is corrected by increasing the imaging distance for red via lens 46.

OTHER EMBODIMENTS

The optical writing device of the present invention is not limited to the aforesaid embodiments and may be variously modified insofar as such modifications do not depart from the scope of the invention.

Specifically, light-emitting diode (LED), liquid crystal shutter (LCS), deformable mirror device (DMD), fluorescent device (FLD) and the like may be substituted for the PLZT solid-state scanning-type element. The present invention is not only applicable to image writing devices that write on paper using silver salt material, but may also be applied to image writing devices that write on silver salt film, and electrophotographic photosensitive members.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A light signal emitting device for emitting light signal, said slight signal emitting device comprising:

a plurality of light signal emitting arrays each of which includes a plurality of light signal emitting elements arranged in a main-scan direction, said plurality of light signal emitting arrays being disposed on a common base in a sub-scan direction substantially orthogonal to the main-scan direction; and an adjuster which adjusts a position of at least one of said plurality of light signal emitting arrays, said adjuster adjusting the position with respect to the sub-scan direction.

2. The light signal emitting device as claimed in claim 1, wherein said adjuster adjusts a position of said common base.

3. The light signal emitting device as claimed in claim 1, further comprising:

a plurality of lenses corresponding to said light signal emitting arrays, respectively, each of said lenses being for focusing a light signal emitted from the light signal emitting element of the respective one of light signal emitting arrays.

4. The light signal emitting device as claimed in claim 3, further comprising:

a second adjuster which adjusts a position of at least one of said lenses relating to the sub-scan direction.

5. The light signal emitting device as claimed in claim 1, wherein color of the light signal emitted from each light signal emitting array is different.

6. A light signal emitting device for emitting light signal, said light signal emitting device comprising:

a plurality of light signal emitting arrays each of which includes a plurality of light signal emitting elements arranged in a main-scan direction, each of said plurality of light signal emitting arrays being disposed on a different base with all the bases extending parallel to each other at a common orientation with respect to the main-scan and sub-scan directions; and an adjuster which adjusts a position of at least one base, said adjuster adjusting the position with respect to the sub-scan direction.

7. The light signal emitting device according to claim 6, wherein each of the plurality of light signal emitting arrays corresponds to one of a plurality of different colors.

8. An optical writing device for writing an image onto an image carrying member, said image carrying member moves in a sub-scan direction relating to said optical writing device, said optical writing device comprising:

a first optical system for emitting light signals of first color, said first optical system comprising a first array of light signal emitting elements and first lens, said light signal emitting elements of said first array being arranged in a main-scan direction substantially orthogonal to the sub-scan direction, said first lens being disposed at an image side of said first array and requiring a first length to focus the light signals of first color; and a second optical system, provided at one side of said first optical system with respect to the sub-scan direction, for emitting light signals of second color, said second optical system comprising a second array of light signal emitting elements and second lens, said light signal emitting elements of said second array being arranged in the main-scan direction, said second lens being disposed at an image side of said second array and requiring a second length to focus the light signals of second color which has a wavelength greater than that of said first color, wherein said first optical system and said second optical system are set in accordance with said first length and said second length, respectively, and said first length depends upon the first lens and the wavelength of the first color, and the second length depends upon the second lens and the wavelength of the second color.

9. The optical writing device as claimed in claim 8, wherein said second length is greater than said first length, and a distance between said second optical system, and the image carrying member is greater than a distance between said first optical system and the image carrying member.

10. The optical writing device as claimed in claim 8, wherein said first length is same as said second length.

11. The optical writing device as claimed in claim 8, wherein said first lens consists of a first lens system, and said second lens consists of a second lens system having the same construction as said first lens system and an optical element, said optical element being for shortening a length for focusing light required for said second lens system.

12. The optical writing device as claimed in claim 11, wherein said first length is same as said second length.

13. The optical writing device as claimed in claim 11, wherein said first length is same as said second length.

14. The optical writing device as claimed in claim 8, further comprising an adjuster which adjusts a position of at least one of said first optical system and said second optical system, said adjuster adjusting the position with respect to the sub-scan direction.

15. The optical writing device as claimed in claim 8, further comprising:

a first housing which accommodates said first optical system; and a second housing which accommodates said second optical system.

16. The optical writing device as claimed in claim 15, further comprising:

an adjuster which adjusts a position of at least one of said first housing and said second housing, said adjuster adjusting the position with respect to the sub-scan direction.

17. The optical writing device as claimed in claim 15, wherein said second length is greater than said first length, and wherein a distance between said second housing and the image carrying member is greater than a distance between said first housing and the image carrying member.

18. The optical writing device as claimed in claim 15, wherein said first length is same as said second length, and wherein said second housing supports an optical element at the image side of second array, said optical element being for shortening a length for focusing light required for said second lens.

19. The optical writing device as claimed in claim 8, further comprising:

a housing which accommodates said first optical system and said second optical system.

20. The optical writing device as claimed in claim 19, further comprising:

an adjuster which adjusts a position of said housing with respect to the sub-scan direction.

21. A light signal emitting device for emitting light signals, comprising:

a plurality of light signal emitting arrays each of which includes a plurality of light signal emitting elements arranged in a main-scan direction, said light signal emitting arrays being disposed in a sub-scan direction substantially orthogonal to the main-scan direction;

a common base on which said plurality of light emitting arrays are provided;

a plurality of lenses corresponding respectively to said plurality of light signal emitting arrays, each lens for focusing a light signal emitted from the light signal emitting element of the corresponding light signal emitting array;

a common housing, said plurality of light signal emitting arrays, said common base and said plurality of lenses positionally fixed relative to the housing in a light emitting direction, orthogonal to the main-scan and sub-scan directions;

a first adjuster for adjusting a position of said plurality of light signal emitting arrays in the sub-scan direction relative to said common housing;

a second adjuster for adjusting a position of said common base in the sub-scan direction relative to said common housing; and a third adjuster for adjusting a position of said plurality of lenses in the sub-scan direction relative to said common housing, wherein said plurality of light signal emitting arrays, said common base and said plurality of lenses are independently positionally adjustable from each other in the sub-scan direction.

22. The light signal emitting device according to claim 21, wherein color of the light signal emitted from each light signal emitting array is different.

23. The light signal emitting device according to claim 21, wherein said plurality of light emitting arrays includes a first light emitting array for a light signal of a first color and a second light emitting array for a light signal of a second color which has a wavelength greater than that of said first color, and said light signal emitting device further comprising an image carrying member moving in the sub-scan direction, and an optical element provided corresponding to the lens for the second light emitting array, said optical element shortening a length for focusing light from the second light emitting array onto said image carrying member.

24. An optical writing device for writing an image on an object having relative movement with respect to the optical writing device, comprising:

a plurality of light signal emitting arrays each including a plurality of light signal emitting elements arranged in a main-scan direction, the relative movement of the object being in a sub-scan direction with respect to the main-scan direction, the plurality of light signal emitting arrays being disposed in the sub-scan direction; and an adjuster connected to at least one light signal emitting array and adjusting a position of the at least one light signal emitting array with respect to the sub-scan direction, wherein the adjuster adjusts the position of the at least one light signal emitting array after the plurality of light signal emitting arrays are installed in the optical writing device.

25. The light signal emitting device as claimed in claim 24, further comprising:

a base on which said light signal emitting arrays are provided, wherein said adjuster adjusts a position of said base.

26. The light signal emitting device as claimed in claim 24, further comprising:

a plurality of bases on which said plurality of light signal emitting arrays are provided, respectively, wherein said adjuster adjust a position of at least one of said plurality of bases.

27. The light signal emitting device as claimed in claim 24, further comprising:

a plurality of lenses corresponding to said light signal emitting arrays, respectively, each of said lenses being for focusing a light signal emitted from the light signal emitting element of the respective one of light signal emitting arrays.

28. The light signal emitting device as claimed in claim 27, further comprising:

a second adjuster connected to at least one lens and adjusting a position of the at least one lens with respect to the sub-scan direction.

29. The light signal emitting device as claimed in claim 24, wherein color of the light signal emitted from each light signal emitting array is different.

* * * * *